United States Patent
Riss et al.

(10) Patent No.: US 11,971,689 B2
(45) Date of Patent: Apr. 30, 2024

(54) OBJECT MANUFACTURING VISUALIZATION

(71) Applicants: Hewlett-Packard Development Company, L.P., Spring, TX (US); INSTITUTO ATLANTICO, Fortaleza (BR)

(72) Inventors: Marcelo Aita Riss, Porto Alegre (BR); Alyne Gomes Soares Cantal, Fortaleza (BR); He Luan, Palo Alto, CA (US); Jun Zeng, Palo Alto, CA (US); Scott Alan White, Boise, ID (US); Sebastia Cortes i Herms, Sant Cugat del Valles (ES); Nailson Boaz Costa Leite, Porto Alegre (BR); Brian Schmitz Tani, Porto Alegre (BR)

(73) Assignees: Hewlett-Packard Development Company, L.P., Spring, TX (US); INSTITUTO ATLANTICO, Fortaleza (BR)

( * ) Notice: Subject to any disclaimer, the term of this patent is extended or adjusted under 35 U.S.C. 154(b) by 396 days.

(21) Appl. No.: 17/283,617

(22) PCT Filed: Dec. 12, 2018

(86) PCT No.: PCT/US2018/065205
§ 371 (c)(1),
(2) Date: Apr. 8, 2021

(87) PCT Pub. No.: WO2020/122897
PCT Pub. Date: Jun. 18, 2020

(65) Prior Publication Data
US 2021/0349428 A1    Nov. 11, 2021

(51) Int. Cl.
| | | |
|---|---|---|
| G05B 13/02 | (2006.01) | |
| B29C 64/393 | (2017.01) | |
| B33Y 30/00 | (2015.01) | |
| B33Y 50/02 | (2015.01) | |
| G06T 7/00 | (2017.01) | |
| G06T 19/00 | (2011.01) | |
| G06T 19/20 | (2011.01) | |

(52) U.S. Cl.
CPC .......... G05B 13/027 (2013.01); B29C 64/393 (2017.08); B33Y 30/00 (2014.12);
(Continued)

(58) Field of Classification Search
CPC ......... B33Y 50/02; B33Y 30/00; B33Y 50/00; B33Y 10/00; B33Y 40/10; B33Y 70/10;
(Continued)

(56) References Cited

U.S. PATENT DOCUMENTS

| | | | |
|---|---|---|---|
| 9,721,384 B1 | 8/2017 | Tran et al. | |
| 2011/0047492 A1* | 2/2011 | Bostrom | H04M 1/27475 715/765 |

(Continued)

FOREIGN PATENT DOCUMENTS

| | | | | |
|---|---|---|---|---|
| JP | 11268142 A | * | 10/1999 | |
| JP | 2000028687 A | * | 1/2000 | ....... G01R 31/31705 |

(Continued)

OTHER PUBLICATIONS

Borish, M., et al., "Defect Identification and Mitigation Via Visual Inspection in Large-Scale Additive Manufacturing", JOM: Journal of Metals, Springer New York LLC, United States, vol. 71, No. 3, Nov. 13, 2018, pp. 893-899.

(Continued)

*Primary Examiner* — Santosh R Poudel
(74) *Attorney, Agent, or Firm* — Shook, Hardy & Bacon L.L.P.

(57) ABSTRACT

Examples of methods for object manufacturing visualization by an electronic device are described herein. In some examples, a predicted thermal image of additive manufacturing is determined using a machine learning model. In some examples, a captured thermal image is obtained. In some examples, a graphical overlay of the predicted thermal image with the captured thermal image is presented.

15 Claims, 6 Drawing Sheets

(52) U.S. Cl.
CPC .............. *B33Y 50/02* (2014.12); *G06T 7/001* (2013.01); *G06T 19/006* (2013.01); *G06T 19/20* (2013.01); *G06T 2207/20076* (2013.01); *G06T 2207/20081* (2013.01); *G06T 2207/20084* (2013.01); *G06T 2207/30144* (2013.01); *G06T 2219/2012* (2013.01)

(58) Field of Classification Search
CPC .. G06F 2113/10; G06F 2119/08; G06F 30/27; G06F 30/23; G06F 17/18; G05B 13/027; G05B 19/4099; G05B 2219/49007; B29C 64/393; B29C 64/386; B29C 64/209; G06T 7/001; G06T 19/006; G06T 19/20; G06T 2207/20076; G06T 2207/20081; G06T 2207/20084; G06T 2207/30144; G06T 2219/2012; G06T 2207/10048; G06T 2207/30116; G06T 17/00; G06N 20/00
See application file for complete search history.

(56) References Cited

U.S. PATENT DOCUMENTS

| | | | |
|---|---|---|---|
| 2013/0120551 A1* | 5/2013 | Yamada | H01J 37/28 348/80 |
| 2014/0163717 A1 | 6/2014 | Das et al. | |
| 2015/0217520 A1 | 8/2015 | Karpas et al. | |
| 2015/0234454 A1 | 8/2015 | Kurz | |
| 2016/0179064 A1 | 6/2016 | Arthur et al. | |
| 2017/0232515 A1 | 8/2017 | Demuth et al. | |
| 2017/0341183 A1 | 11/2017 | Buller et al. | |
| 2018/0068451 A1* | 3/2018 | Leung | H04N 23/683 |
| 2018/0079125 A1 | 3/2018 | Perez et al. | |
| 2018/0095450 A1 | 4/2018 | Lappas et al. | |
| 2018/0120816 A1 | 5/2018 | Schwartz et al. | |
| 2018/0169948 A1 | 6/2018 | Coeck et al. | |
| 2020/0074238 A1* | 3/2020 | Umeno | G06F 18/24 |

FOREIGN PATENT DOCUMENTS

| | | | |
|---|---|---|---|
| KR | 101821285 | 1/2018 | |
| WO | WO-2016200384 A1 * | 12/2016 | ........... B29C 64/165 |
| WO | 2017/194113 A1 | 11/2017 | |
| WO | 2017/194124 A1 | 11/2017 | |
| WO | WO-2017194124 A1 * | 11/2017 | ............. B29C 41/46 |
| WO | WO-2018127827 | 7/2018 | |
| WO | WO-2018222481 A1 * | 12/2018 | |

OTHER PUBLICATIONS

Lile, C., et al., "Anomaly detection in thermal images using deep neural networks", 2017 IEEE International Conference on Image Processing (ICIP), IEEE, Sep. 17, 2017, pp. 2299-2303.

* cited by examiner

OBJECT MANUFACTURING VISUALIZATION

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike traditional machining processes that often remove material to create the final part. In some additive manufacturing techniques, the build material may be cured or fused.

DETAILED DESCRIPTION

Figure 1:
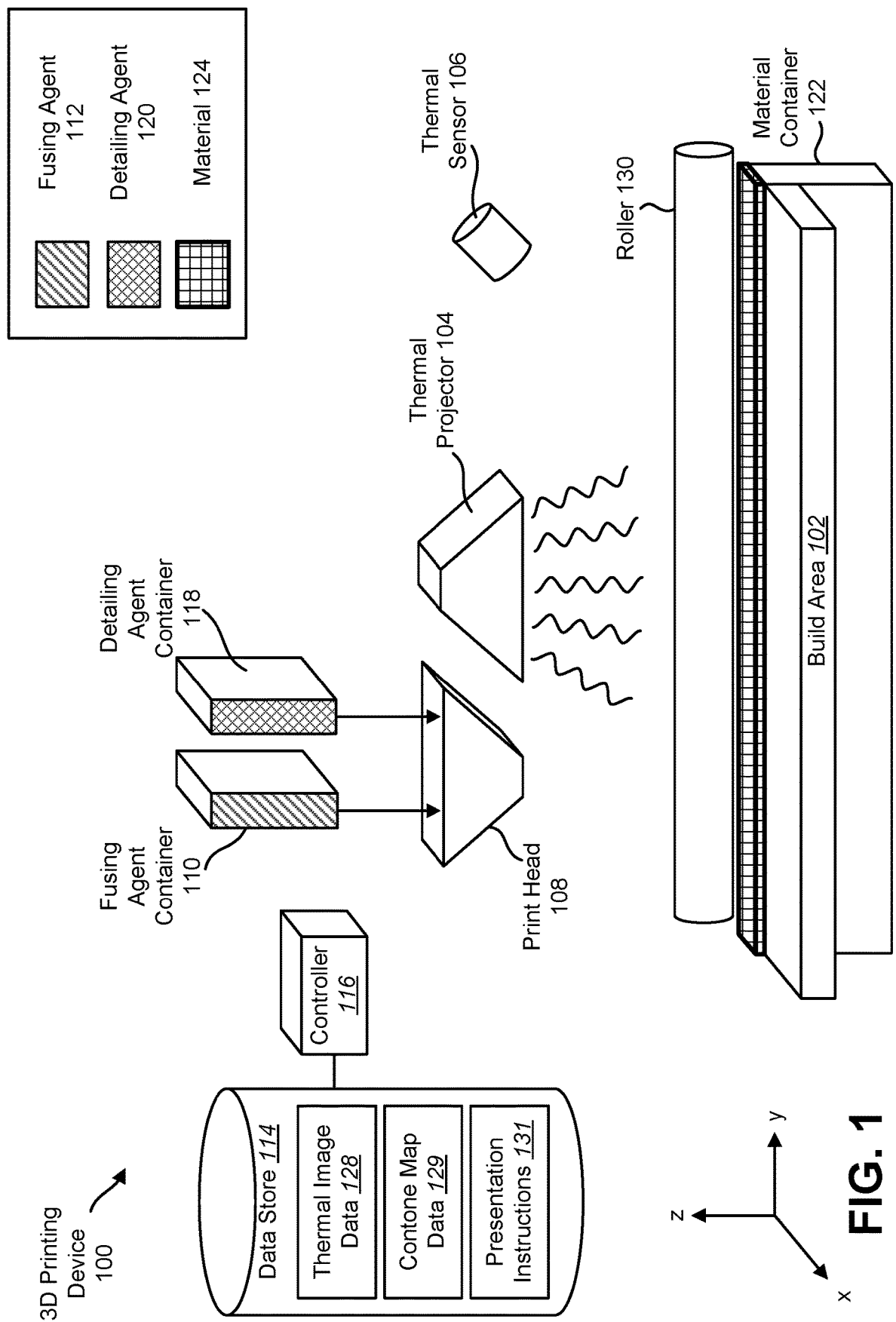
FIG. 1 is a simplified isometric view of an example of a three-dimensional (3D) printing device that may be used in an example of object manufacturing visualization.

Additive manufacturing may be used to manufacture 3D objects. Three-dimensional (3D) printing is an example of additive manufacturing. Some examples of 3D printing may selectively deposit agents (e.g., droplets) at a pixel level to enable control over voxel-level energy deposition. For instance, thermal energy may be projected over material in a build area, where a phase change and solidification in the material may occur depending on the voxels where the agents are deposited.

Some approaches for evaluating additive manufacturing performance may be limited. For example, some approaches to additive manufacturing performance evaluation may be inaccessible or non-intuitive for users. For instance, an end user of a 3D printer may be unable to interpret performance data to obtain an accurate understanding of the location, cause, and/or severity of an additive manufacturing defect or error. Additionally or alternatively, the end user may not have access to intuitive data that shows whether or which 3D printed objects (e.g., parts) suffer from manufacturing defects.

Some of the techniques described herein may provide object manufacturing visualizations (or "visualizations" herein) that intuitively indicate additive manufacturing performance. For example, some of the techniques described herein may indicate the location and/or severity of additive manufacturing defects. A visualization is an image or images including visual data. An object manufacturing visualization is a visualization of an object that is anticipated for manufacture, is being manufactured, or that has been manufactured.

Some examples of object manufacturing visualizations include graphical overlays. A graphical overlay is a graphical indicator illustrated over or on an object image. Some examples of object manufacturing visualizations include a set of viewports. A viewport is an image, window, or graphical user interface that depicts a view or expression of an object. A set of viewports may be arranged together to allow comparison between different views or expressions of an object.

Some visualizations may include or be based on an image or images. Examples of images that may be utilized in visualizations include contone maps and thermal images (e.g., predicted thermal images and/or captured thermal images). A contone map is a set of data indicating a location or locations (e.g., areas) for printing a substance (e.g., fusing agent, detailing agent, or binder agent). A thermal image is a set of data indicating temperature (or thermal energy) in an area.

In some examples, object manufacturing visualization includes obtaining (e.g., sensing and/or capturing) a thermal image or images and/or calculating (e.g., predicting) a thermal image or images. In some examples, a machine learning model (e.g., neural network or networks) may be used to calculate predicted thermal images. A predicted thermal image is a thermal image that is calculated using a machine learning model. For instance, the neural network or networks may utilize a contone map or maps (e.g., voxel-level machine instructions that dictate the placement, quantity, and/or timing of an agent or agents in a build area) and/or a thermal image or images to calculate a predicted thermal image. A captured thermal image is a thermal image that is sensed or captured with a sensor.

It should be noted that while plastics may be utilized as a way to illustrate some of the approaches described herein, the techniques described herein may be applied to some examples of additive manufacturing. Some additive manufacturing techniques may be powder-based and driven by powder fusion. Some additive manufacturing techniques may include metal printing, such as metal jet fusion. In some examples of metal printing, a binder agent may be utilized. Some examples of the approaches described herein may be applied to powder bed fusion-based additive manufacturing, such as Selective Laser Melting (SLM), Selective Laser Sintering (SLS), Multi-Jet Fusion (MJF), etc. Some examples of the approaches described herein may be applied to additive manufacturing where agents carried by droplets are utilized for voxel-level thermal modulation. It should be noted that agents may or may not be utilized in some examples.

As used herein, the term "voxel" and variations thereof may refer to a "thermal voxel." In some examples, the size of a thermal voxel may be defined as a minimum that is thermally meaningful (e.g., larger than 42 microns or 600 dots per inch (dpi)). An example of voxel size is 25.4 millimeters (mm)/150≈170 microns for 150 dots per inch (dpi). A maximum voxel size may be approximately 490 microns or 50 dpi. The term "voxel level" and variations thereof may refer to a resolution, scale, or density corresponding to voxel size. As used herein, a "pixel" is an element of an image (e.g., a 2D image). A pixel may represent a value (e.g., light, color, temperature, etc.) corresponding to a location.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a simplified isometric view of an example of a 3D printing device 100 that may be used in an example of object manufacturing visualization. The 3D printing device 100 may include a controller 116, a data store 114, a build area 102, a print head 108, a fusing agent container 110, a detailing agent container 118, a roller 130, a material container 122, a thermal projector 104, and/or a thermal sensor 106. The example of a 3D printing device 100 in FIG. 1 may include additional components that are not shown, and some of the components described may be removed and/or modified without departing from the scope of the 3D printing device 100 in this disclosure. The components of the 3D printing device 100 may not be drawn to scale, and thus, may have a size and/or configuration different than what is shown.

In the example of FIG. 1, the 3D printing device 100 includes a fusing agent container 110, fusing agent 112, a detailing agent container 118, detailing agent 120, a material container 122, and material 124. In other examples, the 3D printing device 100 may include more or fewer containers, agents, hoppers, and/or materials. The material container 122 is a container that stores material 124 that may be applied (e.g., spread) onto the build area 102 by the roller 130 for 3D printing. The fusing agent container 110 is a container that stores a fusing agent 112. The fusing agent 112 is a substance (e.g., liquid, powder, etc.) that controls intake thermal intensity. For example, the fusing agent 112 may be selectively applied to cause applied material 124 to change phase with heat applied from the thermal projector 104 and/or to fuse with another layer of material 124. For instance, areas of material 124 where the fusing agent 112 has been applied may eventually solidify into the object being printed. The detailing agent 120 is a substance (e.g., liquid, powder, etc.) that controls outtake thermal intensity. For example, the detailing agent 120 may be selectively applied to detail edges of the object being printed.

The build area 102 is an area (e.g., surface) on which additive manufacturing may be performed. In some configurations, the build area 102 may be the base of a "build volume," which may include a volume above the base. As used herein, the term "build area" may refer to the base of a build volume and/or another portion (e.g., another plane above the base) of the build volume.

The roller 130 is a device for applying material 124 to the build area 102. In order to print a 3D object, the roller 130 may successively apply (e.g., spread) material 124 (e.g., a powder) and the print head 108 may successively apply and/or deliver fusing agent 112 and/or detailing agent 120. The thermal projector 104 is a device that delivers energy (e.g., thermal energy, heat, etc.) to the material 124, fusing agent 112, and/or detailing agent 120 in the build area 102. For example, fusing agent 112 may be applied on a material 124 layer where particles (of the material 124) are meant to fuse together. The detailing agent 120 may be applied to modify fusing and create fine detail and/or smooth surfaces. The areas exposed to energy (e.g., thermal energy from the thermal projector 104) and reactions between the agents (e.g., fusing agent 112 and detailing agent 120) and the material 124 may cause the material 124 to selectively fuse together to form the object.

The print head 108 is a device to apply a substance or substances (e.g., fusing agent 112 and/or detailing agent 120). The print head 108 may be, for instance, a thermal inkjet print head, a piezoelectric print head, etc. The print head 108 may include a nozzle or nozzles (not shown) through which the fusing agent 112 and/or detailing agent 120 are extruded. In some examples, the print head 108 may span a dimension of the build area 102. Although a single print head 108 is depicted, multiple print heads 108 may be used that span a dimension of the build area 102. Additionally, a print head or heads 108 may be positioned in a print bar or bars. The print head 108 may be attached to a carriage (not shown in FIG. 1). The carriage may move the print head 108 over the build area 102 in a dimension or dimensions.

The material 124 is a substance (e.g., powder) for manufacturing objects. The material 124 may be moved (e.g., scooped, lifted, and/or extruded, etc.) from the material container 122, and the roller 130 may apply (e.g., spread) the material 124 onto the build area 102 (on top of a current layer, for instance). In some examples, the roller 130 may span a dimension of the build area 102 (e.g., the same dimension as the print head 108 or a different dimension than the print head 108). Although a roller 130 is depicted, other means may be utilized to apply the material 124 to the build area 102. In some examples, the roller 130 may be attached to a carriage (not shown in FIG. 1). The carriage may move the roller 130 over the build area 102 in a dimension or dimensions. In some implementations, multiple material containers 122 may be utilized. For example, two material containers 122 may be implemented on opposite sides of the build area 102, which may allow material 124 to be spread by the roller 130 in two directions.

In some examples, the thermal projector 104 may span a dimension of the build area 102. Although one thermal projector 104 is depicted, multiple thermal projectors 104 may be used that span a dimension of the build area 102. Additionally, a thermal projector or projectors 104 may be positioned in a print bar or bars. The thermal projector 104 may be attached to a carriage (not shown in FIG. 1). The carriage may move the thermal projector 104 over the build area 102 in a dimension or dimensions.

In some examples, each of the print head 108, roller 130, and thermal projector 104 may be housed separately and/or may move independently. In some examples, two or more of the print head 108, roller 130, and thermal projector 104 may be housed together and/or may move together. In one example, the print head 108 and the thermal projector 104 may be housed in a print bar spanning one dimension of the build area 102, while the roller 130 may be housed in a carriage spanning another dimension of the build area 102. For instance, the roller 130 may apply a layer of material 124 in a pass over the build area 102, which may be followed by a pass or passes of the print head 108 and thermal projector 104 over the build area 102.

The controller 116 is a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 116 may be connected to other components of the 3D printing device 100 via communication lines (not shown).

The controller 116 may control actuators (not shown) to control operations of the components of the 3D printing device 100. For example, the controller 116 may control an actuator or actuators that control movement of the print head 108 (along the x-, y-, and/or z-axes), actuator or actuators that control movement of the roller 130 (along the x-, y-, and/or z-axes), and/or actuator or actuators that control movement of the thermal projector 104 (along the x-, y-, and/or z-axes). The controller 116 may also control the actuator or actuators that control the amounts (e.g., proportions) of fusing agent 112 and/or detailing agent 120 to be deposited by the print head 108 from the fusing agent container 110 and/or detailing agent container 118. In some examples, the controller 116 may control an actuator or actuators that raise and lower build area 102 along the z-axis.

The controller 116 may communicate with a data store 114. The data store 114 may include machine-readable instructions that cause the controller 116 to control the supply of material 124, to control the supply of fusing agent 112 and/or detailing agent 120 to the print head 108, to control movement of the print head 108, to control movement of the roller 130, and/or to control movement of the thermal projector 104.

In some examples, the controller 116 may control the roller 130, the print head 108, and/or the thermal projector 104 to print a 3D object based on a 3D model. For instance, the controller 116 may utilize a contone map or maps that are based on the 3D model to control the print head 108. As described above, a contone map is a set of data indicating a location or locations (e.g., areas) for printing a substance (e.g., fusing agent 112, detailing agent 120, or binder agent). In some examples, a contone map may include or indicate machine instructions (e.g., voxel-level machine instructions) for printing a substance. For example, a fusing agent contone map indicates coordinates and/or an amount for printing the fusing agent 112. In an example, a detailing agent contone map indicates coordinates and/or an amount for printing the detailing agent 120. In other examples, a binder agent contone map indicates coordinates and/or an amount for printing a binder agent. A binder agent contone map may be utilized instead of a fusing agent contone map in some implementations. In some examples, a contone map may correspond to a two-dimensional (2D) layer (e.g., 2D slice, 2D cross-section, etc.) of the 3D model. For instance, a 3D model may be processed to produce a plurality of contone maps corresponding to a plurality of layers of the 3D model. A contone map or maps may be stored in the data store 114 as contone map data 129. In some examples, a contone map may be expressed as a 2D grid of values, where each value may indicate whether to print an agent and/or an amount of agent at the location on the 2D grid. For instance, the location of a value in the 2D grid may correspond to a location in the build area 102 (e.g., a location (x, y) of a particular level (z) at or above the build area 102). In some examples, a contone map may be a compressed version of the aforementioned 2D grid or array (e.g., a quadtree).

The data store 114 is a machine-readable storage medium. Machine-readable storage is any electronic, magnetic, optical, or other physical storage device that stores executable instructions and/or data. A machine-readable storage medium may be, for example, Random Access Memory (RAM), an Electrically Erasable Programmable Read-Only Memory (EEPROM), a storage drive, an optical disc, and the like. A machine-readable storage medium may be encoded with executable instructions for controlling the 3D printing device 100. A computer-readable medium is an example of a machine-readable storage medium that is readable by a processor or computer.

The thermal sensor 106 is a device that senses or captures thermal data. The thermal sensor 106 may be integrated into, mounted in, and/or otherwise included in a machine (e.g., printer). In some examples, the thermal sensor 106 may capture thermal images of the build area 102. For instance, the thermal sensor 106 may be an infrared thermal sensor (e.g., camera) that captures thermal images of the build area 102 (e.g., applied material in the build area 102). In some examples, the thermal sensor 106 may capture thermal images during manufacturing (e.g., printing). For example, the thermal sensor 106 may capture thermal images online and/or in real-time.

As described above, a thermal image is a set of data indicating temperature (or thermal energy) in an area. A thermal image may be captured (e.g., sensed) from a thermal sensor 106 or may be calculated (e.g., predicted). For example, the thermal sensor 106 may capture a thermal image of a layer to produce a captured thermal image.

In some examples, a captured thermal image may be a two-dimensional (2D) grid of sensed temperatures (or thermal energy). In some examples, each location in the 2D grid may correspond to a location in the build area 102 (e.g., a location (x, y) of a particular level (z) at or above the build area 102). The thermal image or images may indicate thermal variation (e.g., temperature variation) over the build area 102. For example, thermal sensing over the build area 102 may indicate (e.g., capture and encapsulate) environmental complexity and heterogeneous thermal diffusivity. In some approaches, the thermal image or images may be transformed to align with a contone map or contone maps (e.g., registered with the contone map or maps).

In some examples, the controller 116 may receive a captured thermal image of a layer from the thermal sensor 106. For example, the controller 116 may command the thermal sensor 106 to capture a thermal image and/or may receive a captured thermal image from the thermal sensor 106. In some examples, the thermal sensor 106 may capture a thermal image for each layer of an object being manufactured. Each captured thermal image may be stored as thermal image data 128 in the data store 114.

In some examples, the data store 114 may include presentation instructions 131. The controller 116 may execute the presentation instructions 131 to present a visualization. For example, the controller 116 may generate and/or present a visualization. Presenting a visualization includes providing visual information (e.g., pixels, renders, visual models, etc.) for display. Examples of a visualization include graphical overlays and viewports.

In some examples, the controller 116 may present a graphical overlay of a contone map with a captured thermal image. Presenting the graphical overlay of the contone map with the captured thermal image may include generating a graphical overlay that is based on the contone map and/or the captured thermal image. For example, the graphical overlay may include all or a portion of the contone map, all or a portion of the captured thermal image, and/or an indication or data (e.g., difference, sum, scoring, etc.) based on the contone map and the captured thermal image. For example, the controller 116 may combine (e.g., subtract, add, score, etc.) the contone map and the captured thermal image for visualization to provide insights to a user on how to understand manufacturing (e.g., printing) performance, aid in debugging the 3D printing device 100, aid in debugging print defects, and/or to guide investigation into a cause of a defect.

In some examples, the graphical overlay may include an indicator (e.g., pattern, color, number, character, etc.) on the contone map or a portion of the contone map that indicates a degree of difference (e.g., greater than a threshold difference) between the contone map and the captured thermal image. In some examples, the graphical overlay may include an indicator (e.g., pattern, color, number, character, etc.) on the capture thermal image or a portion of the captured thermal image that indicates a degree of difference (e.g., greater than a threshold difference) between the contone map and the captured thermal image. In some examples, different degrees of difference may be illustrated with different patterns, colors, numbers, and/or characters, etc.

In some examples, the graphical overlay may include the contone map (or a semi-transparent version of the contone map) superimposed with the captured thermal image (or a semi-transparent version of the captured thermal image. A degree of difference between the contone map (or a portion thereof) and the captured thermal image (or a portion thereof) may be emphasized with an indicator (e.g., pattern, color, number, character, etc.).

In some examples, the graphical overlay may include or be based on a stack of contone maps and/or a stack of captured thermal images. For example, the controller 116 may produce a 3D rendering by stacking a plurality of contone maps (or a portion thereof) and/or by stacking a plurality of captured thermal images (or a portion thereof). The graphical overlay may be generated for the contone maps and/or captured thermal images to produce a 3D graphical overlay.

In some examples, the contone map may be a fusing contone map. Visually overlaying the fusing contone map (e.g., fusing agent data) and the captured thermal image may illustrate thermal diffusion (e.g., thermal bleeding).

In some examples, the contone map may be a detailing contone map. Visually overlaying the detailing contone map (e.g., detailing agent data) and the captured thermal image may illustrate thermal inhibition (e.g., the effectiveness of thermal inhibition).

In some examples, presenting a visualization may include presenting the visualization on a display. For example, the 3D printing device 100 may include a display, may be coupled to a display, and/or may be in communication with another device (e.g., computer, tablet, smartphone, television, etc.). The controller 116 may provide the visualization (e.g., graphical overlay) to a display and/or to another device for presentation. For example, the 3D printing device 100 may include a communication interface (not shown in FIG. 1) to communicate with a display or another device to send the visualization for presentation. The visualization (e.g., visualization data) may be sent via a wired or wireless connection, for example.

In some examples, the data store 114 may store machine learning data (not shown in FIG. 1), and/or predicted thermal image data. The machine learning data may include data defining a machine learning model. Examples of machine learning models include a neural network or neural networks. For instance, the machine learning data may define a node or nodes, a connection or connections between nodes, a network layer or network layers, and/or a neural network or neural networks. Examples of neural networks include convolutional neural networks (CNNs) (e.g., basic CNN, deconvolutional neural network, inception module, residual neural network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of a neural network or neural networks may be utilized.

In some examples, the controller 116 uses the neural network or networks (defined by the machine learning data) to predict thermal images. For example, the controller 116 may calculate (e.g., predict), using a neural network or a plurality of neural networks, a predicted thermal image of a layer based on a captured thermal image or a plurality of captured thermal images and a contone map or a plurality of contone maps (e.g., a fusing contone map and a detailing contone map). The contone map or maps may be utilized as inputs to the neural network or networks.

Predicting, calculating, or computing the predicted thermal image may include calculating the predicted thermal image of the layer before, at, or after a time that the layer is formed. Accordingly, a thermal image for a layer may be "predicted" before, during, and/or after forming a layer. For example, a thermal image may be predicted for a layer that has not yet been applied and/or printed. Additionally or alternatively, thermal behavior (e.g., a thermal image) may be predicted for a layer at a time after application and/or printing. As used herein, the term "predict" and variants thereof may denote calculation with a machine learning model (e.g., neural network or networks).

In some examples, a number of captured thermal images of previous layers may be utilized in the calculation of a predicted thermal image. The contone map or maps may correspond to the same layer (e.g., layer k) as the layer corresponding to the predicted thermal image.

In some examples, the predicted thermal image may correspond to a layer that is the same as a layer corresponding to the captured thermal image. For example, the captured thermal image may correspond to a layer k and the predicted thermal image may correspond to the layer k. It should be noted that a number of captured thermal images of previous layers may also be utilized in the calculation in some examples. The contone map or maps may correspond to the same layer (e.g., layer k) as the layer corresponding to the predicted thermal image and/or to a previous layer or layers.

A contone map may be a representation of agent placement (e.g., placement and/or quantity for a fusing agent and/or placement and/or quantity for a detailing agent). While contone maps are given as examples of data input into the neural network or networks, other information or data may be utilized in addition to or alternatively from contone maps. For example, slices may be utilized to assist predicting thermal images and/or may be utilized as an alternative learning dataset. In particular, slices may be used instead of a contone map or contone maps or in addition to a contone map or contone maps in some examples.

It should be noted that thermal images (e.g., voxel-level captured thermal images) may be utilized to train the neural network or networks in some examples. For instance, the controller 116 may compute a loss function based on the predicted thermal image and the thermal image. The neural network or networks may be trained based on the loss function. An example of a neural network that may be utilized is described in connection with FIG. 6.

In some examples, the controller 116 may generate and/or present a visualization (e.g., graphical overlay) based on the predicted thermal image and the captured thermal image. For example, the predicted thermal image and the captured thermal image may be utilized instead of or in addition to the contone map or maps to generate and/or present a visualization (e.g., graphical overlay) as described herein.

Figure 2:
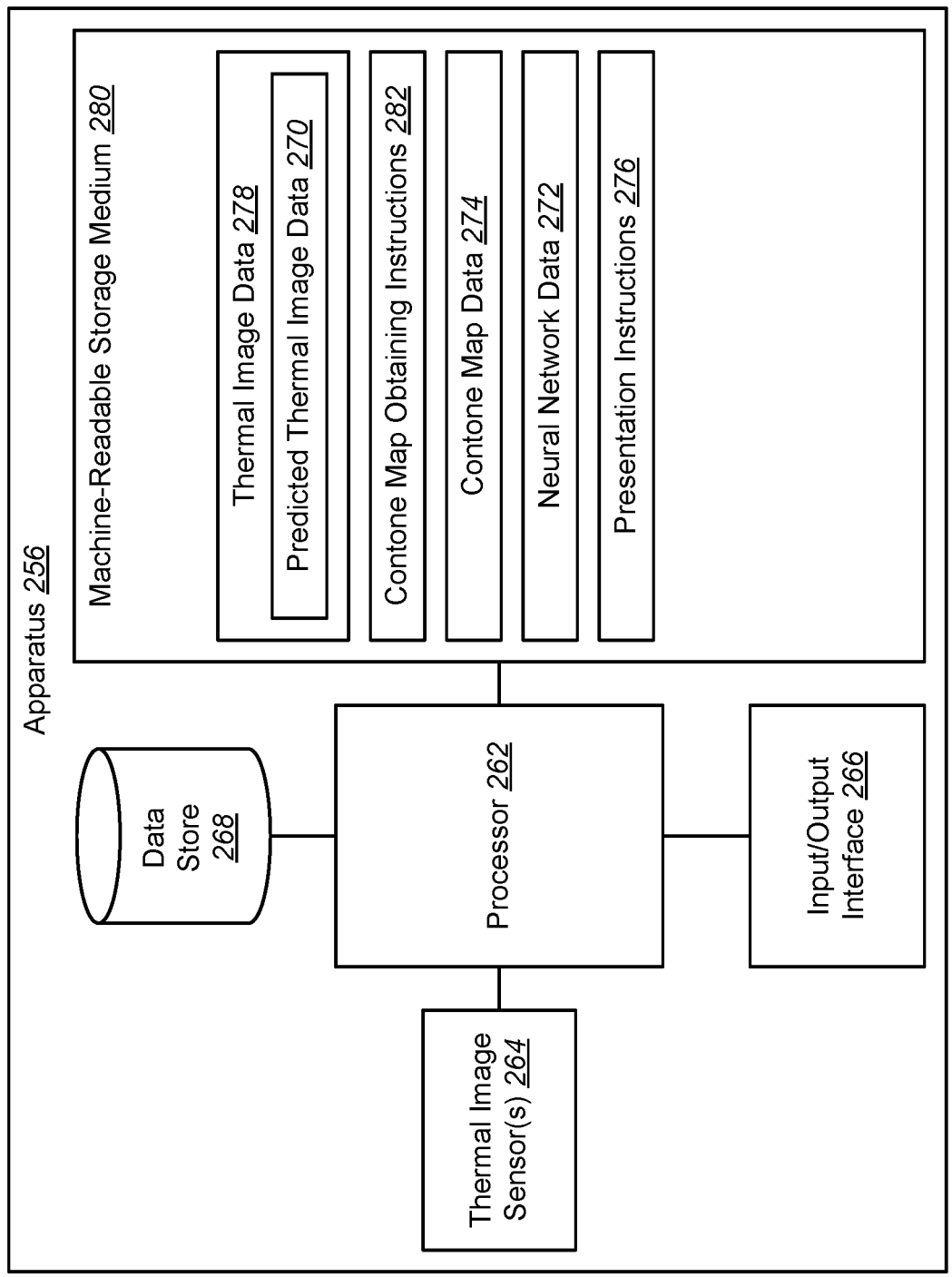
FIG. 2 is a block diagram of an example of an apparatus that may be used in object manufacturing visualization.

FIG. 2 is a block diagram of an example of an apparatus 256 that may be used in object manufacturing visualization. The apparatus 256 may be a computing device, such as a personal computer, a server computer, a printer, a 3D printer, a smartphone, a tablet computer, etc. The apparatus 256 may include and/or may be coupled to a processor 262, a data store 268, an input/output interface 266, a machine-readable storage medium 280, and/or a thermal image sensor or sensors 264. In some examples, the apparatus 256 may be in communication with (e.g., coupled to, have a communication link with) an additive manufacturing device (e.g., the 3D printing device 100 described in connection with FIG. 1). Alternatively, the apparatus 256 may be an example of the 3D printing device 100 described in connection with FIG. 1. For instance, the processor 262 may be an example of the controller 116 described in connection with FIG. 1, the data store 268 may be an example of the data store 114 described in connection with FIG. 1, and the thermal image sensor or sensors 264 may be an example of the thermal sensor 106 described in connection with FIG. 1. The apparatus 256 may include additional components (not shown) and/or some of the components described herein may be removed and/or modified without departing from the scope of this disclosure.

The processor 262 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 280. The processor 262 may fetch, decode, and/or execute instructions (e.g., presentation instructions 276) stored on the machine-readable storage medium 280. Additionally or alternatively, the processor 262 may include an electronic circuit or circuits that include electronic components for performing a functionality or functionalities of the instructions (e.g., presentation instructions 276). In some examples, the processor 262 may be configured to perform one, some, or all of the functions, operations, elements, methods, etc., described in connection with one, some, or all of FIGS. 1-6.

The machine-readable storage medium 280 may be any electronic, magnetic, optical, or other physical storage device that contains or stores electronic information (e.g., instructions and/or data). Thus, the machine-readable storage medium 280 may be, for example, Random Access Memory (RAM), Electrically Erasable Programmable Read-Only Memory (EEPROM), a storage device, an optical disc, and the like. In some implementations, the machine-readable storage medium 280 may be a non-transitory tangible machine-readable storage medium, where the term "non-transitory" does not encompass transitory propagating signals.

The apparatus 256 may also include a data store 268 on which the processor 262 may store information. The data store 268 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the machine-readable storage medium 280 may be included in the data store 268. Alternatively, the machine-readable storage medium 280 may be separate from the data store 268. In some approaches, the data store 268 may store similar instructions and/or data as that stored by the machine-readable storage medium 280. For example, the data store 268 may be non-volatile memory and the machine-readable storage medium 280 may be volatile memory.

The apparatus 256 may further include an input/output interface 266 through which the processor 262 may communicate with an external device or devices (not shown), for instance, to receive and store the information pertaining to an object or objects to be manufactured (e.g., printed). The input/output interface 266 may include hardware and/or machine-readable instructions to enable the processor 262 to communicate with the external device or devices. The input/output interface 266 may enable a wired or wireless connection to the external device or devices. The input/output interface 266 may further include a network interface card and/or may also include hardware and/or machine-readable instructions to enable the processor 262 to communicate with various input and/or output devices, such as a keyboard, a mouse, a display, another apparatus, electronic device, computing device, etc., through which a user may input instructions into the apparatus 256.

In some examples, the machine-readable storage medium 280 may store thermal image data 278. The thermal image data 278 may be obtained (e.g., received) from a thermal image sensor or sensors 264 and/or may be predicted. For example, the processor 262 may execute instructions (not shown in FIG. 2) to obtain a captured thermal image or images for a layer or layers. In some examples, the apparatus 256 may include a thermal image sensor or sensors 264, may be coupled to a remote thermal image sensor or sensors, and/or may receive thermal image data 278 (e.g., a thermal image or images) from a (integrated and/or remote) thermal image sensor. Some examples of thermal image sensors 264 include thermal cameras (e.g., infrared cameras). Other kinds of thermal sensors may be utilized. In some examples, a thermal image sensor or sensors 264 may provide voxel-level (or near voxel-level) thermal sensing for neural network training.

The thermal image data 278 may include a thermal image or images. As described above, a thermal image may be an image that indicates heat (e.g., temperature) over an area and/or volume. For example, a thermal image may indicate a build area temperature distribution (e.g., thermal temperature distribution over a top layer). In some examples, the thermal image sensor or sensors 264 may undergo a calibration procedure to overcome distortion introduced by the thermal image sensor or sensors 264. For example, a thermal image may be transformed to register the thermal image with the contone map or maps. Different types of thermal sensing devices may be used in different examples.

In some examples, the processor 262 may execute contone map obtaining instructions 282 to obtain contone map data 274. For example, the contone map obtaining instructions 282 may generate a contone map or maps (e.g., from slice data and/or 3D model data) and/or may receive a contone map or maps from another device (via the input/output interface 266, for example). The contone map data 274 may indicate agent distribution (e.g., fusing agent distribution and/or detailing agent distribution) at the voxel level for printing a 3D object. For instance, the contone map data 274 may be utilized as per-layer machine instructions (e.g., voxel-level machine instructions) for agent distribution.

It should be noted that multiple different agent contone maps corresponding to different abilities to absorb or remove thermal energies may be utilized in some examples. Additionally or alternatively, some examples may utilize different print modes where multiple contone maps may be used for each agent.

For a given layer (e.g., a current layer, a top layer, etc.), the contone map or maps of all agents deposited to the layer may be an energy driving force in some examples. It should be noted that another voxel-level energy influencer may include neighboring voxels in previous layers that may have a temperature differential compared to a given voxel, which may induce heat flux into or out of the voxel.

The machine-readable storage medium 280 may store neural network data 272. The neural network data 272 may include data defining and/or implementing a neural network or neural networks. For instance, the neural network data 272 may define a node or nodes, a connection or connections between nodes, a network layer or network layers, and/or a neural network or neural networks. In some examples, the processor 262 may utilize (e.g., execute instructions included in) the neural network data 272 to calculate predicted thermal images. A predicted thermal image or images may be stored as predicted thermal image data 270 on the machine-readable storage medium 280.

In some examples, the processor 262 uses the neural network or networks (defined by the neural network data 272) to calculate a predicted thermal image or images. For example, the processor 262 may calculate the predicted thermal image using a neural network or networks based on the contone map or maps. The predicted thermal image or images may be stored as predicted thermal image data 270. For instance, the processor 262 may calculate (e.g., predict), using a neural network or a plurality of neural networks, predicted thermal images based on captured thermal images and contone maps (e.g., fusing contone maps and detailing contone maps).

In some examples, the processor 262 may execute the presentation instructions 276 to present an object manufacturing visualization. For example, the processor 262 may execute the presentation instructions 276 to present a graphical overlay and/or to present a set of viewports. In some examples, the processor 262 may execute the presentation instructions 276 to present a first viewport of stacked fusing contone maps, a second viewport of stacked detailing contone maps, a third viewport of stacked predicted thermal images, and/or a fourth viewport of stacked captured thermal images. For example, the processor 262 may assemble or stack contone maps, and/or thermal images. The stacked contone maps and/or stacked captured thermal images may produce a 3D render of the object or objects. In some examples, the processor 262 may stack a portion or portions of the contone maps and/or thermal images. For example, the processor 262 may utilize a portion or portion of the contone maps and/or thermal images corresponding to the object or objects (e.g., parts). For instance, the processor 262 may exclude a non-object portion from the stack. Examples of stacked contone maps and stacked thermal images are given in connection with FIG. 3.

In some examples, the machine-readable storage medium 280 may store 3D model data (not shown in FIG. 2). The 3D model data may be generated by the apparatus 256 and/or received from another device. In some examples, the machine-readable storage medium 280 may include slicing instructions (not shown in FIG. 2). For example, the processor 262 may execute the slicing instructions to perform slicing on the 3D model data to produce a stack of 2D vector slices.

In some examples, the processor 262 may send the visualization (e.g., graphical overlay, set of viewports, etc.) to a display for presentation. Examples of the display include a Liquid Crystal Display (LCD) panel, Organic Light Emitting Diode (OLED) panel, Cathode Ray Tube (CRT) screen, etc. In some examples, the apparatus 256 may include a display (not shown in FIG. 2) on which the visualization may be presented. Additionally or alternatively, the processor 262 may send (via the input/output interface 266, for example) the visualization to a remote display and/or to a remote device for presentation.

In some examples, the presentation instructions 276 may include 3D printing instructions. For instance, the processor 262 may execute the 3D printing instructions to print a 3D object or objects. In some implementations, the 3D printing instructions may include instructions for controlling a device or devices (e.g., rollers, print heads, and/or thermal projectors, etc.). For example, the 3D printing instructions may use a contone map or contone maps (stored as contone map data, for instance) to control a print head or heads to print an agent or agents in a location or locations specified by the contone map or maps. In some examples, the processor 262 may execute the 3D printing instructions to print a layer or layers. The printing (e.g., thermal projector control) may be based on thermal images (e.g., captured thermal images and/or predicted thermal images).

In some examples, the machine-readable storage medium 280 may store neural network training instructions. The processor 262 may execute the neural network training instructions to train a neural network or neural networks (defined by the neural network data 272, for instance). In some examples, the processor 262 may train the neural network or networks using a set of captured training thermal images. In some approaches, the neural network training instructions may include a loss function. The processor 262 may compute the loss function based on a predicted thermal image and a captured training thermal image. For example, the captured training thermal image may provide the ground truth (which may or may not be at voxel-level) for the loss function. The loss function may be utilized to train a neural network or neural networks. For example, a node or nodes and/or a connection weight or weights in the neural network or networks may be adjusted based on the loss function in order to improve the prediction accuracy of the neural network or networks. It should be noted that not all of the elements and/or features described in connection with FIG. 2 may be required in all implementations.

Figure 3:
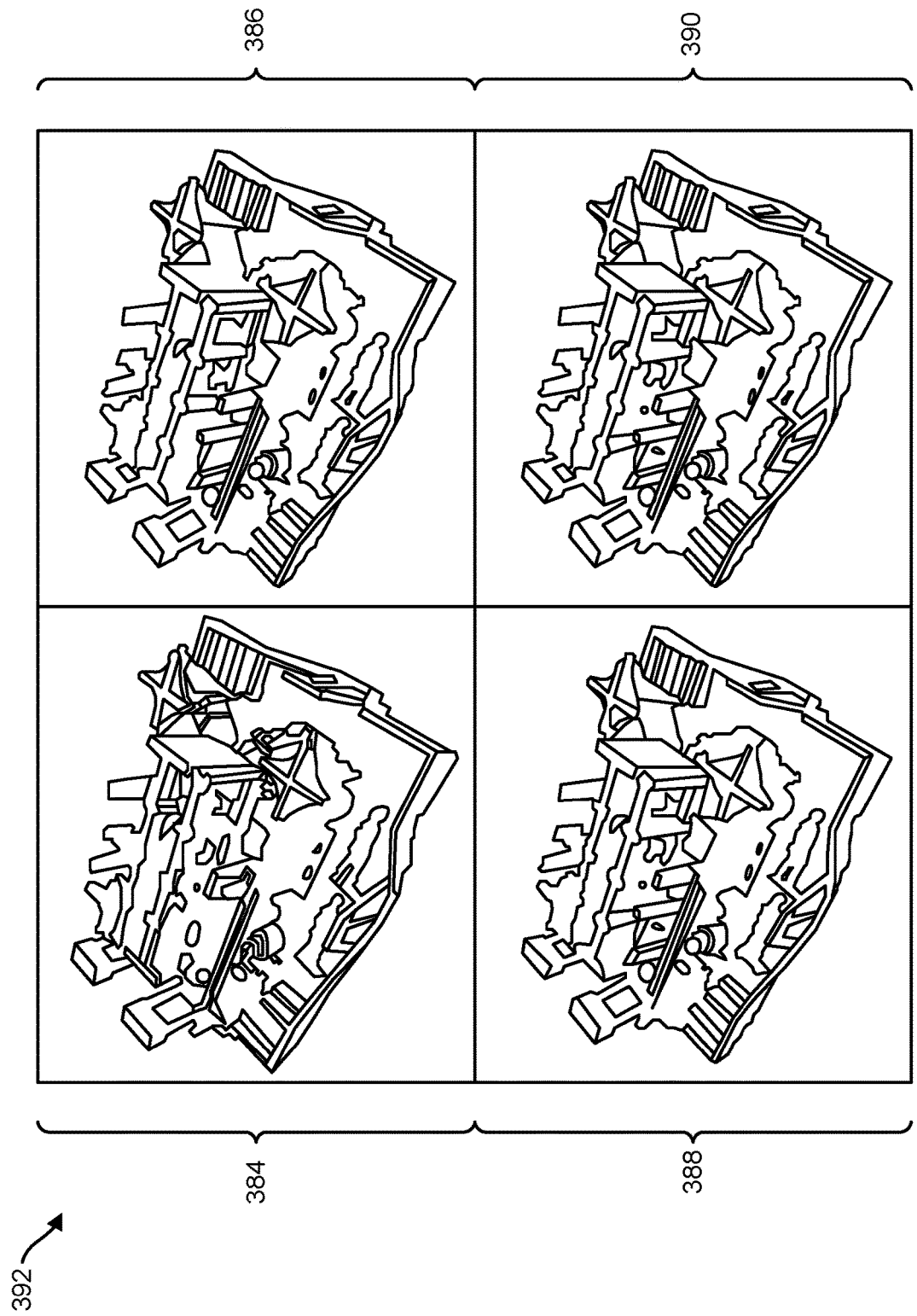
FIG. 3 is a diagram illustrating an example of a set of viewports.

FIG. 3 is a diagram illustrating an example of a set of viewports 392. The set of viewports 392 includes a first viewport 384 of stacked fusing contone maps, a second viewport 386 of stacked detailing contone maps, a third viewport 388 of stacked predicted thermal images, and a fourth viewport 390 of stacked captured thermal images. In some examples, the apparatus 256 may present the set of viewports 392 on a display. As can be observed, the set of viewports 392 allows for comparisons between printing instructions (e.g., the contone maps), predicted thermal images, and/or captured thermal images. As illustrated, each viewport may include a stacked set of images (e.g., contone maps or thermal images) to provide a 3D view or render of the objects (e.g., parts) manufactured.

Figure 4:
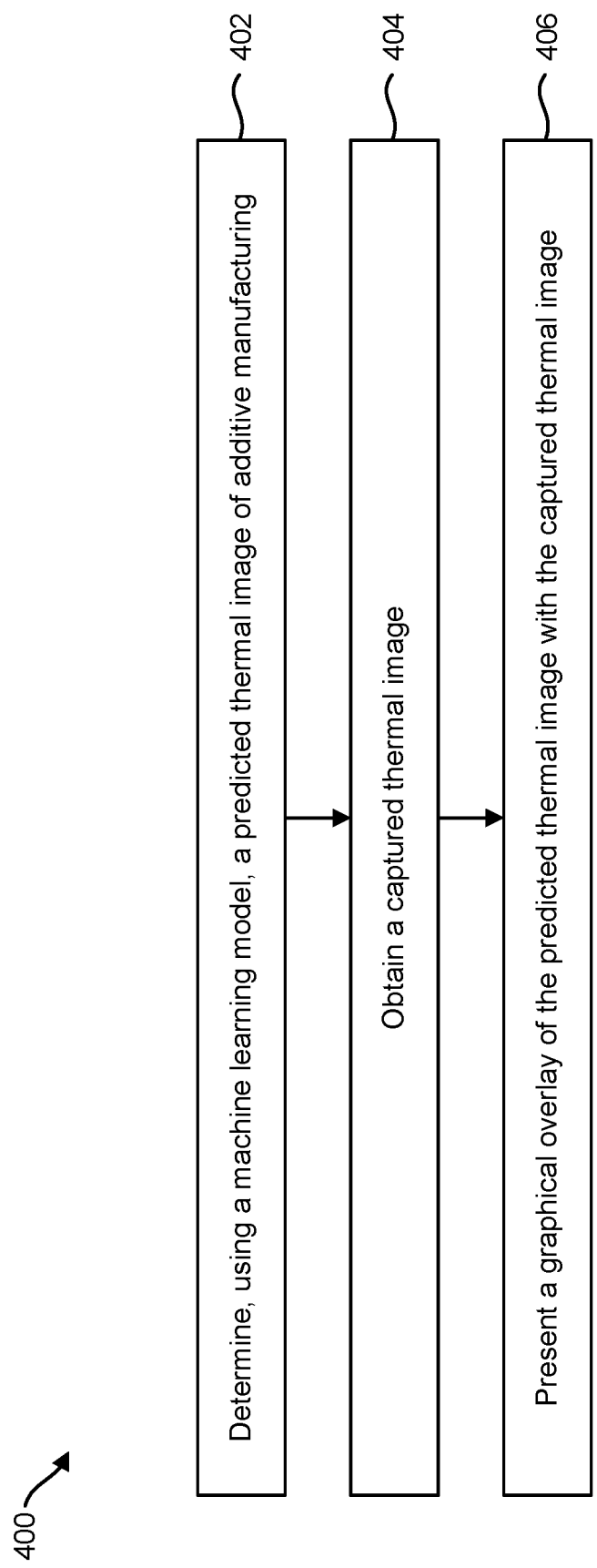
FIG. 4 is a flow diagram illustrating an example of a method for object manufacturing visualization.

FIG. 4 is a flow diagram illustrating an example of a method 400 for object manufacturing visualization. The method 400 and/or a method 400 element or elements may be performed by an electronic device. For example, the method 400 may be performed by the apparatus 256 described in connection with FIG. 2 (and/or by the 3D printing device 100 described in connection with FIG. 1).

The apparatus 256 may determine 402, using a machine learning model, predicted thermal images of additive manufacturing. For example, the apparatus 256 may utilize a neural network or neural networks to calculate predicted thermal images of layers of an object or objects of additive manufacturing. In some examples, the predicted thermal images may be calculated based on a contone map or maps and/or a captured thermal image or images.

The apparatus 256 may obtain 404 a captured thermal image. For example, after a layer has been deposited, the apparatus 256 may obtain 404 a captured thermal image of the layer using a thermal image sensor or may receive a captured thermal image of the layer from a remote image sensor.

The apparatus 256 may present 406 a graphical overlay of the predicted thermal image with the captured thermal image. Presenting the graphical overlay of the predicted thermal image with the captured thermal image may include generating a graphical overlay that is based on the predicted thermal image and/or the captured thermal image. For example, the graphical overlay may include all or a portion of the predicted thermal image, all or a portion of the captured thermal image, and/or an indication or data (e.g., difference, sum, scoring, etc.) based on the predicted thermal image and the captured thermal image. For example, the controller 116 may combine (e.g., subtract, add, score, etc.) the predicted thermal image and the captured thermal image for visualization to provide insights to a user on how to understand manufacturing (e.g., printing) performance, aid in debugging the apparatus 256, aid in debugging print defects, and/or to guide investigation into a cause of a defect.

In some examples, a difference between the predicted thermal image and the captured thermal image may be visualized (e.g., calculated, scored, graded, presented, presented in a graphical overlay, etc.). In some examples, the difference may indicate the error of the machine learning model (e.g., prediction model, neural network, etc.). The visualization (e.g., graphical overlay) may provide insights to a user regarding where prediction errors occur (e.g., boundaries, specific areas, etc.) and/or how the machine learning model may be improved. For example, if the machine learning model was deficient in predicting fine details, boundaries, sharp corners, or large parts, etc., then the machine learning model may benefit from improvement to better predict such features. Accordingly, some examples of the visualization determination and presentation described herein may be useful in machine learning model development.

In some examples, the graphical overlay may include an indicator (e.g., pattern, color, number, character, etc.) on the predicted thermal image or a portion of the predicted thermal image that indicates a degree of difference (e.g., greater than a threshold difference) between the predicted thermal image and the captured thermal image. In some examples, the graphical overlay may include an indicator (e.g., pattern, color, number, character, etc.) on the capture thermal image or a portion of the captured thermal image that indicates a degree of difference (e.g., greater than a threshold difference) between the predicted thermal image and the captured thermal image. In some examples, different degrees of difference may be illustrated with different patterns, colors, numbers, and/or characters, etc.

In some examples, the graphical overlay may include the predicted thermal image (or a semi-transparent version of the predicted thermal image) superimposed with the captured thermal image (or a semi-transparent version of the captured thermal image. A degree of difference between the predicted thermal image (or a portion thereof) and the captured thermal image (or a portion thereof) may be emphasized with an indicator (e.g., pattern, color, number, character, etc.).

In some examples, the graphical overlay may include or be based on a stack of predicted thermal image and/or a stack of captured thermal images. For example, the apparatus 256 may produce a 3D rendering by stacking a plurality of predicted thermal image (or a portion thereof) and/or by stacking a plurality of captured thermal images (or a portion thereof). The graphical overlay may be generated for the predicted thermal image and/or captured thermal images to produce a 3D graphical overlay. In some examples, the method 400 may include stacking a plurality of predicted thermal images (or a portion(s) thereof). The graphical overlay may be presented 406 with the plurality of predicted thermal images.

In some examples, the method 400 may include masking the predicted thermal image and/or captured thermal image using a contone map to produce a part map. For example, a contone map (e.g., fusing contone map) may indicate a portion or portions of the predicted thermal image and/or captured thermal image that correspond to the object or objects (e.g., part or parts). For instance, a portion that corresponds to an object is an area to be formed into an object or part. A non-object portion is an area not to be formed into an object or part. Masking the predicted thermal image and/or captured thermal image with the contone map may separate the portion(s) corresponding to an object or objects from the non-object portion. Accordingly, masking the predicted thermal image and the captured thermal image using a contone map may produce part maps having an object portion. A part map may include an object portion or portions and may exclude a non-object portion or portions.

In some examples, the method 400 may include determining an anomaly score or anomaly scores. An anomaly score is a value (e.g., numeric value) that indicates a degree of disparity between an expected characteristic (e.g., structure, geometry, or thermal behavior) and an actual characteristic. For example, the anomaly score may indicate a degree of disparity between the predicted thermal image or images and the captured thermal image or images. Examples of the anomaly score include a job anomaly score that indicates a degree of disparity for an entire additive manufacturing job, an object anomaly score that indicates a degree of disparity for an object (e.g., one object of multiple objects in a job), and a local anomaly score that indicates a degree of disparity for a location (e.g., pixel, voxel, etc.). Examples of techniques for calculating anomaly scores are given as follows.

In some examples, determining an anomaly score or scores may include calculating a difference between the predicted thermal image (or a portion or portions thereof) and the captured thermal image (or a portion or portions thereof). For example, the apparatus 256 may subtract a pixel value or values of the captured thermal image from a pixel value or values of the predicted thermal image. Alternatively, the apparatus 256 may subtract a pixel value or values of the predicted thermal image from a pixel value or values of the captured thermal image. In some examples, the difference may be calculated for a portion or portions of the captured thermal image and/or predicted thermal image. For example, the portion or portions of the predicted thermal image and the captured thermal image corresponding to an object or objects (e.g., part(s), melted part(s), etc.) may be utilized to calculate the difference. As described above, a fusing contone map (of the same layer, for example) may be utilized to mask (e.g., segment) the predicted thermal image and the captured thermal image into a portion or portions corresponding to an object or objects (e.g., part maps). The portion or portions may indicate the actual position of the object or objects in a layer. In some examples, job information may indicate the number of objects. For example, the apparatus 256 may store data that annotates or indexes each object with a corresponding position. The difference may include a set of difference values corresponding to the pixels or voxels of the portion or portions.

In some examples, determining the anomaly score or scores may include calculating an average of the difference. For example, the apparatus 256 may calculate an average of difference values (or of the absolute value of difference values) for each object. For instance, for each predicted thermal image (e.g., layer) of an object, the apparatus 256 may calculate the average of the absolute value of the difference using the corresponding captured thermal image(s). The average of the difference for each part may be utilized to calculate an object anomaly score for each object.

In some examples, determining the anomaly score or scores may include calculating an anomaly score based on the average and based on statistical values of the machine learning model. For example, when the machine learning model is being trained, statistical values (e.g., mean (µ) and standard deviation (σ) of the machine learning model (e.g., of differences between predicted thermal images and captured training thermal images) may be determined. The statistical values of the machine learning model may represent expected behavior of an additive manufacturing process.

In some examples, calculating an anomaly score may be performed in accordance with Equation (1).

$$\text{Score} = \frac{x - \mu}{\sigma} \quad (1)$$

In Equation (1), Score is an anomaly score, x is a difference (e.g., average difference for a job, average difference for an object, or local difference value), µ is the mean of the machine learning model, and a is the standard deviation of the machine learning model. For an object anomaly score, x may be the average difference between the predicted thermal image(s) and the captured thermal image(s) for that object. For a job anomaly score, x may be the average difference (e.g., average difference of the object average differences) for all of the objects in the job. For example, the apparatus 256 may calculate the average difference for all of the objects in the job and use the mean and standard deviation of the machine learning model to calculate the job anomaly score as illustrated in Equation (1).

For a local anomaly score, x may be the difference value at a location (e.g., pixel, voxel, etc.). In some examples, the apparatus 256 may calculate a set of local anomaly scores. For example, the apparatus 256 may calculate a set of local difference values between the predicted thermal image(s) and the captured thermal image(s) (e.g., a difference value for each pixel of an object or objects). The apparatus 256 may calculate the set of local anomaly scores based on the set of local difference values and based on the statistical values of the machine learning model in accordance with Equation (1).

In some examples, the method 400 may include comparing an anomaly score or scores (e.g., the set of anomaly scores) to a set of thresholds to produce a grade or grades (e.g., set of grades). In some examples, the set of thresholds includes multiples of a standard deviation of the machine learning model. An example of the set of thresholds is given in Table (1). It should be noted that although Table (1) provides some examples for the set of thresholds, other thresholds and/or another function may be utilized to map the anomaly score(s) to grade(s).

TABLE 1

| | Under-Melted | | | | Normal | | | Over-Melted |
| --- | --- | --- | --- | --- | --- | --- | --- | --- |
| | | | | Score Thresholds | | | | |
| | <−3σ | −3σ | −2σ | −1σ | 0 | 1σ | 2σ | 3σ | >3σ |
| Grade | 0 | 20 | 40 | 60 | 100 | 60 | 40 | 20 | 0 |

In some examples, presenting the graphical overlay may be based on the anomaly score or scores. For example, presenting the graphical overlay may include presenting a value or values (e.g., score(s) or grade(s)), pattern, color, or other indicator for a job, object(s), and/or location. For example, the apparatus 256 may compare the set of local anomaly scores to the set of thresholds to produce a set of grades over the captured thermal image. The apparatus 256 may color code the graphical overlay based on the set of grades. Examples of graphical overlays are given in connection with FIG. 5.

As illustrated in the example shown in Table (1), an anomaly score that is more than two standard deviations below a mean of the machine learning model may indicate an under-melted job, object, or portion of an object. Additionally or alternatively, as illustrated in the example shown in Table (1), an anomaly score that is more than two standard deviations above a mean of the machine learning model may indicate an over-melted job, object, or portion of an object.

Figure 5:
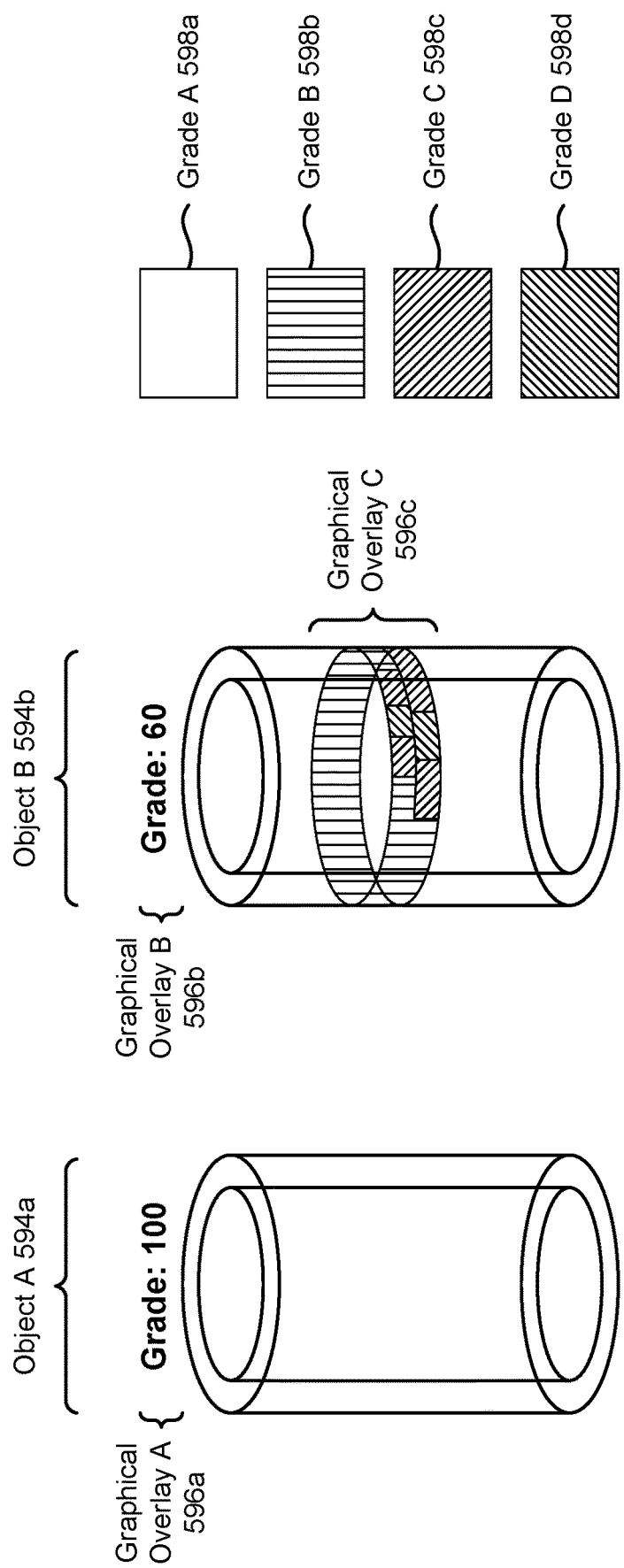
FIG. 5 is a diagram illustrating examples of graphical overlays for objects of an additive manufacturing.

FIG. 5 is a diagram illustrating examples of graphical overlays 596a-c for objects 594a-b of an additive manufacturing process. In particular, an apparatus 256 may present object A 594a (e.g., on a display, in a window, in a graphical user interface (GUI), etc.) with graphical overlay A 596a. In this example, graphical overlay A 596a is a set of characters with (e.g., over) object A 594a indicating a grade for the object. In this example, the average anomaly score for object A 594a corresponds to a grade of 100 (e.g., the average anomaly score is within ±1 a from the mean of the machine learning model).

Object B 594b is also illustrated in FIG. 5 as an example. In this example, an apparatus 256 may present object B 594b (e.g., on a display, in a window, in a graphical user interface (GUI), etc.) with graphical overlay B 596b and/or graphical overlay C 596c. In this example, graphical overlay B 596b is a set of characters with (e.g., over) object B 594b indicating a grade for the object. In this example, the average anomaly score for object B 594b corresponds to a grade of 60 (e.g., the average anomaly score is between ±1σ and 2σ from the mean of the machine learning model).

Graphical overlay C 596c illustrates grades 598b-d over (e.g., superimposed with) portions of object B 594b. In this example, different patterns are utilized to illustrate grades 598a-d. Additionally or alternatively, different colors may be utilized to illustrate different grades. For example, grade A 598a may correspond to a numerical grade of 100, grade B 598b may correspond to a numerical grade of numerical grade of 40, grade C 598c may correspond to a numerical grade of numerical grade of 20, and grade D 598d may correspond to a numerical grade of numerical grade of 0 in Table (1). Graphical overlay C 596c identifies specific portions of object B 594b that deviate to varying degrees from expected thermal behavior.

As can be observed from FIG. 5, graphical overlays may help a user to intuitively locate objects or portions of objects that may include defects. For example, after segmenting the objects and having the thermal differences and scores calculated, the 3D image of the objects may be reconstructed and portions with high anomaly scores may be marked based on the anomaly scores. The 3D visualization may show the anomalies by job, by object, and/or by portion. For example, each pixel may represent a corresponding voxel's score and the object score may be calculated with an average.

Figure 6:
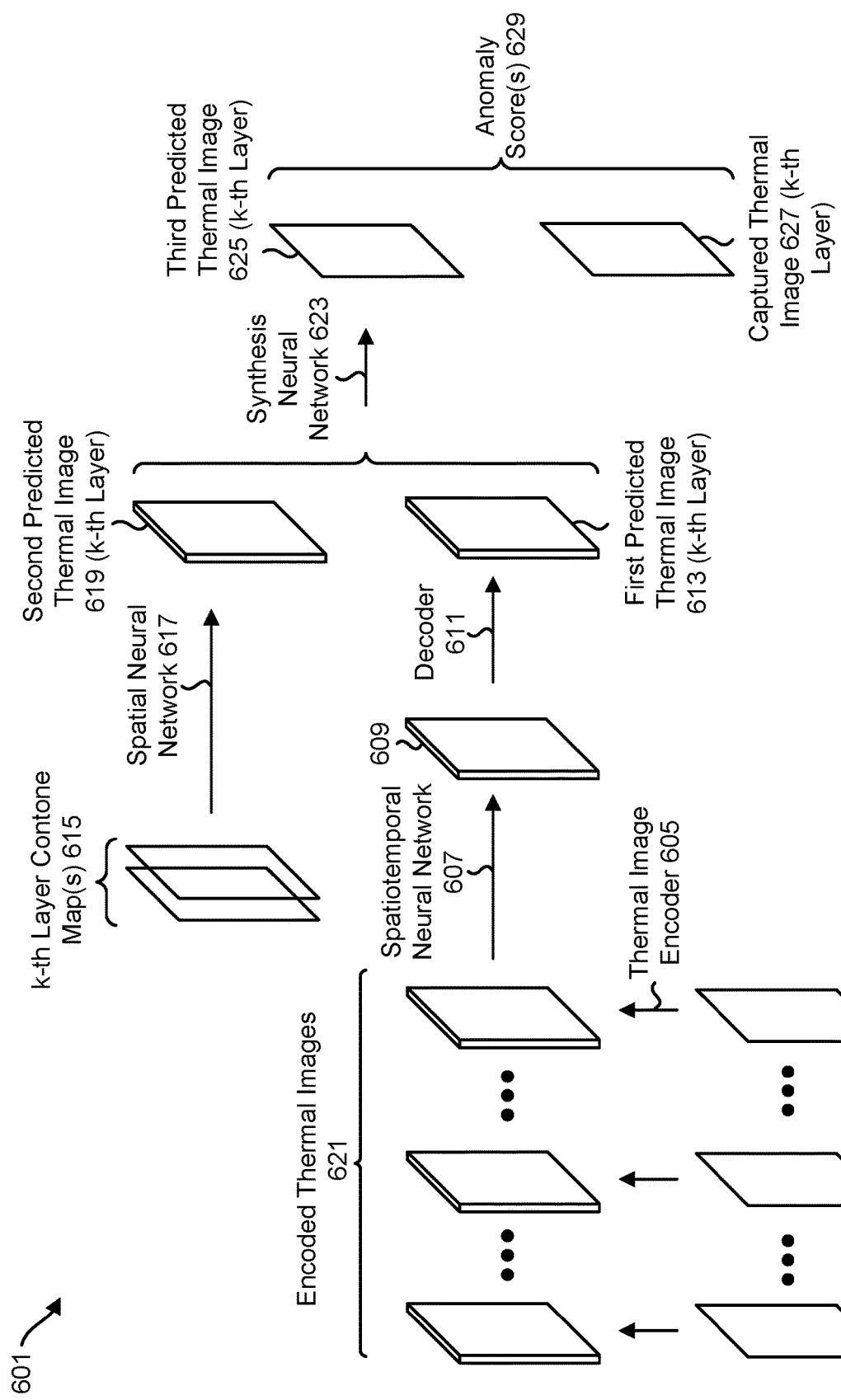
FIG. 6 is a diagram illustrating an example of a neural network architecture.

FIG. 6 is a diagram illustrating an example of a neural network architecture 601. The neural network architecture 601 described in connection with FIG. 6 may be an example of the machine learning models or neural networks described in connection with FIGS. 1-5. The neural network architecture 601 may take into account voxel-level thermal influencers to the fusing layer. A deep neural network with the neural network architecture 601 may learn spatiotemporal information, in recognition of two thermal influencers to the fusing layer thermal behavior: the energy absorption and/or loss driven by contone maps 615, and the voxel-level thermal coupling both within a layer and among different layers. The neural network architecture 601 may include a spatiotemporal neural network 607. An example of a spatiotemporal neural network 607 is a recurrent neural network. In some examples, the spatiotemporal neural network 607 may include one or multiple Convolutional Long Short-Term Memory networks (Conv-LSTM). A Conv-LSTM is a type of recurrent neural network that overcomes numerical instability issues and takes spatial and temporal influence into account.

At each layer, the current layer contone maps 615 (or data based on the contone maps) and a previous layer captured thermal image 603 (or data based on the previous layer captured thermal image) may be utilized as input. The thermal image encoder 605 may encode the previous layer captured thermal image 603 to produce an encoded thermal image 621.

The spatiotemporal neural network 607 may learn layer heat transferred from previous layers, which may simulate heat transfer. The encoded thermal image 621 may be provided as input to the spatiotemporal (e.g., Conv-LSTM) neural network 607. The output 609 for the k-th layer (at the current timestamp, for example) may be passed through a decoder 611 to produce a first predicted thermal image 613 for the k-th layer (e.g., the fusing layer).

A spatial neural network 617 may learn a thermal image generated by a contone map or maps (e.g., fusing contone map and/or detailing contone map). An example of the spatial neural network 617 is a convolutional neural network (CNN). A CNN may include a variety of components (e.g., convolutional layers, pooling layers, de-convolutional layers, inception layers, residual layers, etc.) The k-th layer contone map(s) 615 may be input to the spatial neural network 617, which may produce a second predicted thermal image 619 for the k-th layer.

The first predicted thermal image 613 and the second predicted thermal image 619 may be provided to a synthesis neural network 623. An example of the synthesis neural network 623 is a CNN. The synthesis neural network 623 may learn and synthesize the contribution of the predicted thermal image from the contone map(s) and the contribution of the predicted thermal image from the previous captured thermal images. For example, the synthesis neural network 623 may synthesize the first predicted thermal image 613 and the second predicted thermal image 619 to produce a third predicted thermal image 625.

In some examples, the third predicted thermal image 625 and a captured thermal image 627 (of the k-th layer) may be utilized to determine an anomaly score or scores 629 as described herein. For example, the apparatus 256 may calculate the anomaly score or scores 629 as described herein based on the third predicted thermal image 625 and a captured thermal image 627. As described herein, the anomaly score or scores 629 may be utilized to produce a grade or grades and/or to present a graphical overlay.

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:

1. A method for object manufacturing visualization by an electronic device, comprising:
determining, using a machine learning model, a predicted thermal image of a current layer in additive manufacturing, wherein the predicted thermal image is determined by the machine learning model based on at least using a contone map that corresponds to the current layer and a captured thermal image of a previous layer;
obtaining a captured thermal image of the current layer; and
presenting, via graphical user interface, a graphical overlay of the predicted thermal image of the current layer superimposed the captured thermal image of the current layer.

2. The method of claim 1, further comprising stacking a plurality of predicted thermal images, wherein the graphical overlay is presented with the plurality of predicted thermal images.

3. The method of claim 1, further comprising masking the predicted thermal image and the captured thermal image using a contone map to produce part maps.

4. The method of claim 1, further comprising:
calculating a difference between the predicted thermal image and the captured thermal image;
calculating an average of the difference; and
calculating an anomaly score based on the average and based on statistical values of the machine learning model, wherein the anomaly score is calculated by subtracting a mean of the machine learning model from the difference calculated, and further dividing by a standard deviation of the machine learning model.

5. The method of claim 1, further comprising:
calculating a set of difference values between the predicted thermal image and the captured thermal image; and
calculating a set of anomaly scores based on the set of difference values and based on statistical values of the machine learning model.

6. The method of claim 5, further comprising comparing the set of anomaly scores to a set of thresholds to produce a set of grades over the captured thermal image.

7. The method of claim 6, further comprising color coding the graphical overlay based on the set of grades.

8. The method of claim 6, wherein the set of thresholds comprises multiples of a standard deviation of the machine learning model.

9. The method of claim 8, wherein an anomaly score that is more than two standard deviations below a mean of the machine learning model indicates an under-melted portion of an object.

10. The method of claim 8, wherein an anomaly score that is more than two standard deviations above a mean of the machine learning model indicates an over-melted portion of an object.

11. A three-dimensional (3D) printing device, comprising:
a print head to print an agent based on a contone map;
a thermal projector;
a thermal sensor; and
a controller, wherein the controller is to:
receive a captured thermal image from the thermal sensor for a current layer;
calculate a predicted thermal image for a current layer using a neural network based on a plurality of contone maps for a current layer and a captured thermal image of a previous layer; and present a graphical overlay that superimposes the predicted thermal image and the captured thermal image of the current layer.

12. The 3D printing device of claim 11, wherein the plurality of contone maps are fusing contone maps.

13. The 3D printing device of claim 12, wherein the plurality of contone maps are detailing contone map.

14. A non-transitory tangible computer-readable medium storing executable code, comprising:

code to cause a processor to obtain fusing contone maps of layers and detailing contone maps of layers;

code to cause the processor to obtain captured thermal images of layers;

code to cause the processor to calculate predicted thermal images for the layers using a neural network based on the fusing contone maps, the detailing contone maps, and the captured thermal images for the corresponding layers; and code to cause the processor to present a first viewport of stacked fusing contone maps, a second viewport of stacked detailing contone maps, a third viewport of stacked predicted thermal images, and a fourth viewport of stacked captured thermal images.

15. The computer-readable medium of claim 14, wherein the stacked fusing contone maps, the stacked detailing contone maps, the stacked predicted thermal images, and the stacked captured thermal images exclude a non-object portion.

* * * * *